April 13, 1937.  C. L. MEISTER  2,077,248
CYLINDER BORING BAR AND ATTACHMENT
Filed March 8, 1934  2 Sheets-Sheet 1
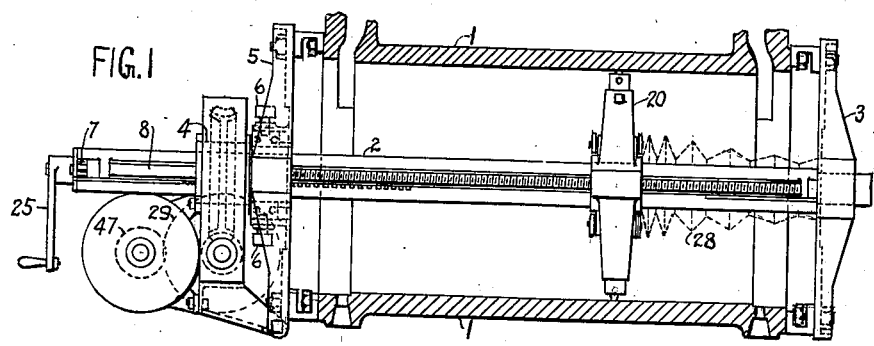
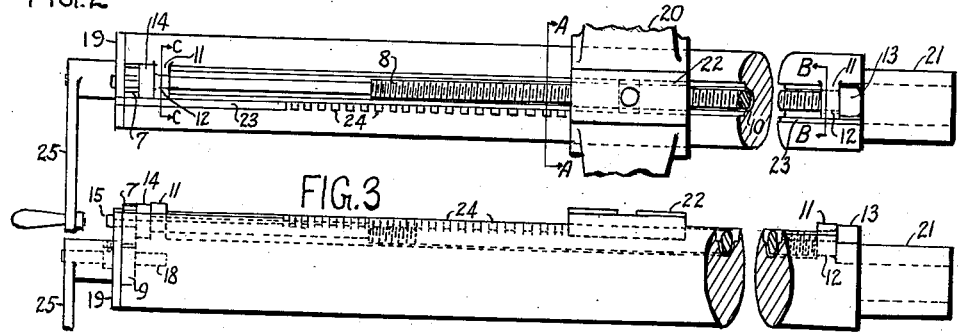
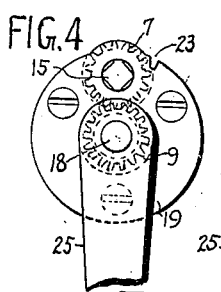
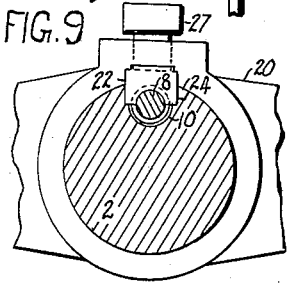
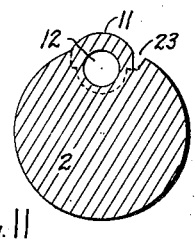
WITNESS
L. L. Palmer.
W. W. Chadwick.
INVENTOR
Conrad L. Meister.

April 13, 1937.　　　　C. L. MEISTER　　　　2,077,248
CYLINDER BORING BAR AND ATTACHMENT
Filed March 8, 1934　　　　2 Sheets-Sheet 2
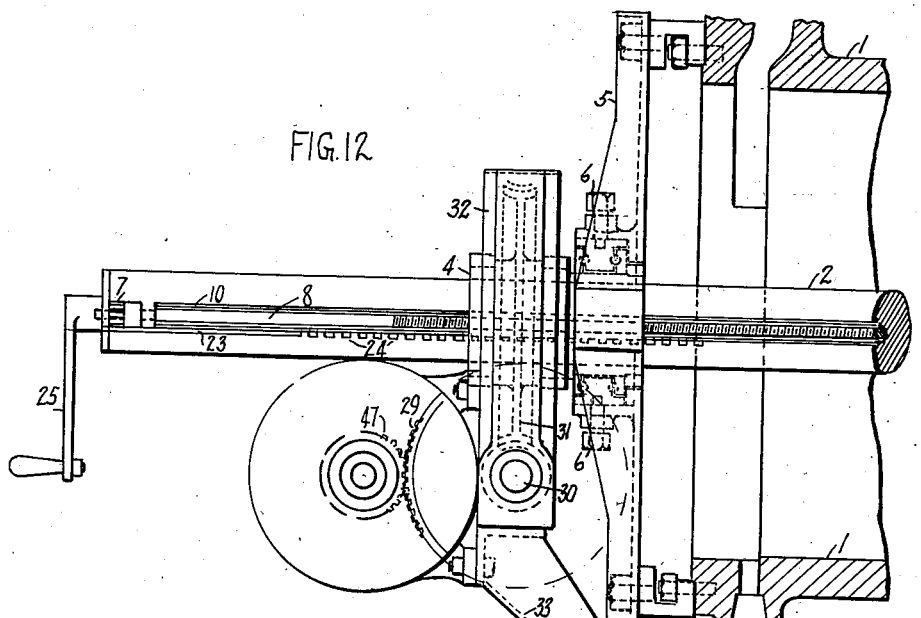
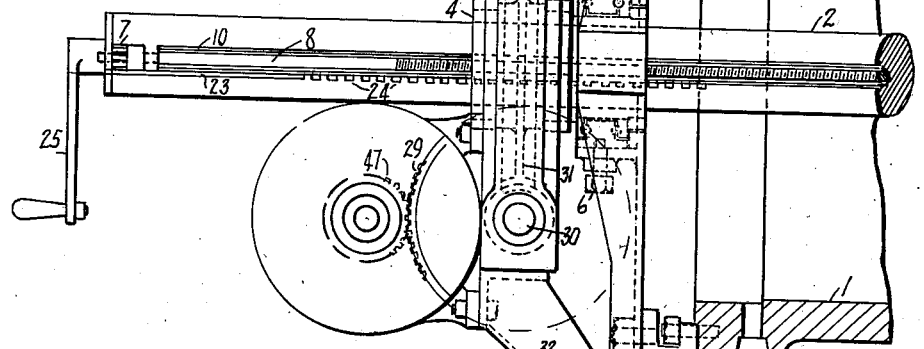
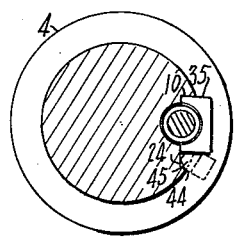
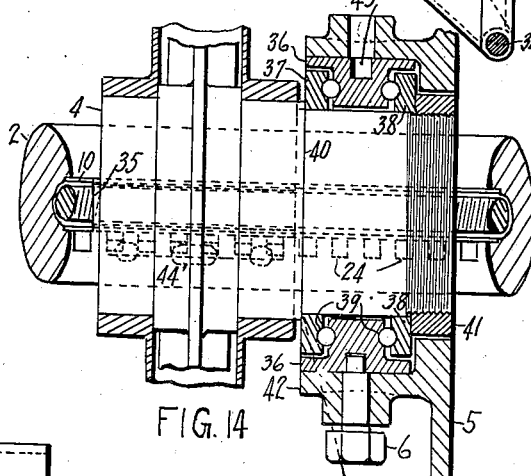
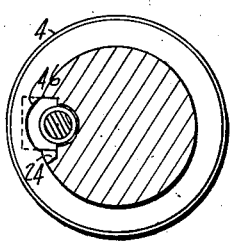
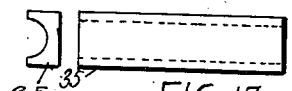
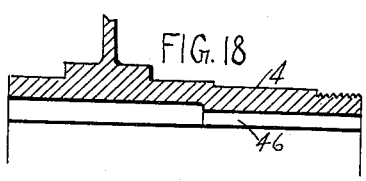
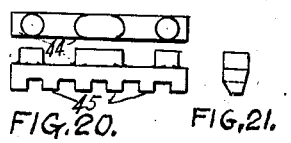
WITNESS
W. W. Chadwick
L. L. Palmer.
INVENTOR
Conrad L. Meister.

Patented Apr. 13, 1937

2,077,248

UNITED STATES PATENT OFFICE 2,077,248

CYLINDER BORING BAR AND ATTACHMENT

Conrad L. Meister, Wilmington, N. C.

Application March 8, 1934, Serial No. 714,686

12 Claims. (Cl. 77—2)

My invention relates to new and useful improvements in cylinder boring bars and attachments for portable boring bars and the like, especially those designed for boring and reboring locomotive cylinders.

Although this mechanism is adaptable for application to portable boring bars used for other purposes than the boring or reboring of locomotive cylinders, my description will be confined to the type of boring bar customarily used for this class of work.

The present type of portable boring bars used in railroad and similar repair shops—while comparatively heavy pieces of apparatus—have several small but vital inherent weaknesses which prevent their producing good and true work unless it is slowly and painstakingly done.

In operation when the cutting tool is actuated by the feed screw the resistance of the metal being cut imparts a backward thrust through the cutter head, feed nut and feed screw to the boring bar itself, and if the boring bar was not securely held this backward or end thrust would cause the bar to slip endwise rendering the whole performance inoperative.

Boring bars now in use are prevented from slipping endwise by a band clamp loosely held between one of the crosshead adjusting sleeves and a collar secured to this sleeve. Tightening the clamp holds it to the bar and the boring bar end thrust is transmitted to the collar then through the collar bolts to the adjusting sleeve, and through the screws which adjust and centralize the sleeve to the crossbar which is secured to the cylinder being bored. The bolt which tightens the clamp on the bar is small and difficult to manipulate—the surfaces of the clamp and the bar are purposely made smooth so under even favorable conditions the clamp holds the bar only when slow speeds, light cuts or fine feeds are made.

When the band clamp is tightened on the bar it revolves with the boring bar and the bolts which hold the outer collar to the adjusting sleeve have to be spaced far enough away to not only provide clearance for the band clamp but for the lug on each end of the band clamp, through which the tightening bolt is passed, and boring bar operators have frequently been hurt and maimed by having their fingers caught between the revolving band clamp lugs and the stationary bolts securing the outer collar to the adjusting sleeve.

The principal object of my invention is to so lock or interrelate the holding parts of the boring bar as to enable the operator to not only increase the turning speed of the bar but also to materially increase the feed of the cut, and the depth of the cut if necessary, so that the boring or reboring of the cylinders can be finished in much shorter time.

Increasing the feed per revolution of the cutter head permits boring the cylinder from end to end while taking fewer revolutions and as the time per revolution is the same, the total boring time is considerably shortened.

Increasing the feed however causes a material increase in the end thrust, and as this thrust is transmitted through the feed screw, changes have to be made in combining the feed screw and the bar in such a manner as to neutralize and minimize the effects of this end thrust through the feed screw.

Feed screws in boring bars similar in kind to the one here described, at present in use, are laid in the feed screw slot with a series of small collars on the end nearest the feed gear. These collars transmit the thrust to a strap sunk in flush with the surface of the bar and fitting partly over the outside of the feed screw and the collars on the same. The far end of the feed screw is slightly reduced in diameter and also held in the slot by a similar strap let in flush and secured to the bar. Thus the thrust is resisted by a few small circular or crescent shaped segments and wear soon develops because the thrust is concentrated on a comparatively small area, causing lost motion which produces tool tremor or chatter.

Another cause of tool tremor or chatter is due to the fact that the backward thrust in boring bars other than here described, acts compressively through the feed screw between the feed nut and the holding strap. As the feed screw is small in diameter compared to the distance between the places where it is held, this compressive force causes it to bend. The force increases until the cutting resistance of the metal is overcome, thus allowing the feed screw to assume its straight line shape, only to repeat the bending when the force again increases. This alternate bending and straightening imparts a tremor or chatter to the cutter head, resulting in unsatisfactory work. Operators of boring bars have learned by experience the only way they can reduce or cover up the effects of this troublesome tremor or chatter caused by the feed screw, is to take extremely light cuts and fine feeds, calling for the installation of complicated arrangements of gears to operate the feed screw very carefully and therefore bore the cylinder with painstaking slowness.

Another object of my invention is to reduce materially the wear at the end of the feed screw and thus eliminate to a considerable extent a fruitful source of tool chatter or vibration which mitigates against true work.

Another object of my invention is to change the direction of the force acting through the feed screw, which moves the cutter head along the boring bar and causes it to produce a tension in the feed screw instead of compression, and by so doing eliminate another source of tool chatter or vibration.

All boring bars have some way or means to prevent counter-rotation of the driving mechanism, otherwise they would be inoperative Another object of my invention is to so lock or secure the housing of the driving mechanism with the boring bar support as to prevent its rotation and eliminate another source of vibration due to shock.

Another object of my invention is to arrange anti-friction bearings for the bar to turn in, which indisputably provides for smoother performance.

Having clearly demonstrated its usefulness, my invention consists of certain new and novel arrangements and combinations of parts as will be hereinafter more fully described and pointed out.

Referring now to the drawings—

Figure 1 indicates a vertical section of a cylinder with a portable boring bar in place. The bar is supported by crossbars firmly secured to the front and back ends of the cylinder by the cylinder head studs.

The motor and reducing gear to drive the bar are also outlined and one of the improved forms of adjustable cutter heads is shown on the bar.

Figures 2 and 3 indicate horizontal plan and elevation views of the boring bar with the feed screw and feed gears in place.

Figures 4 and 5 show more clearly the feed gear end of the bar and

Figures 6 and 7 the opposite end of the bar or end with the reduced extension.

Figure 8 is a longitudinal view of the feed screw.

Figure 9 shows a section through the bar at A—A, as designated in Figure 2.

Figure 10 shows a side elevation of the cutter head drive nut.

Figure 11 shows a section through the boring bar at B—B, which is similar to the section at C—C, both designated in Fig. 2.

Figure 12 shows the driving mechanism for driving the bar more in detail than that shown in Fig. 1.

Figures 13, 14 and 15 show end views and plan of the drive member or hub with its drive nut and lock key in position and, in section, how the anti-friction thrust bearing is mounted on said member and held in the central bore of the crossbar which is attached to the end of the cylinder which is to be bored.

Figure 16 shows an end view and Figure 17 shows a plan of the boring bar drive key.

Figure 18 shows, in cross section, how the drive member is recessed to receive the drive nut and also how it is recessed to pass over any raised portions on the boring bar when it is slid over the same.

Figure 19 shows a plan, Figure 20 a side elevation and Figure 21 an end view of the lock-key which locks the bar and prevents the bar from sliding endways through the drive member when operating.

Referring more specifically to the several views and to Fig. 1. There is shown a vertical section of a cylinder 1. The piston, piston rod, front and back cylinder heads have been removed and a portable boring bar 2 has been set up in the cylinder, one end resting in the center support of the back crossbar 3, the bar passing through a member 4, which while being free to rotate in the central bore 42 of the front crossbar 5, is firmly prevented from moving longitudinally by the set screws 6 as will be more fully described in detail later on.

The supporting crossbars 3 and 5 are shown set away from the joint faces of the cylinder in the customary manner and one of the modern types of double ended adjustable cutter heads 20 is shown in place on the bar.

This adjustable type of cutter head 20, as covered by the Graham Patent No. 1,953,402, dated April 3, 1934, or my application Serial 690,695, permits rapid adjustment of the cutter tools whether the bar is in motion or not and because of this unusual advantageous feature we can and have eliminated the usual train of feed screw gears and show only the minimum required. Gear 7 is secured to one end of the feed screw 8, and gear 9 meshes with gear 7 as shown more clearly in Figs. 4 and 5.

There is also indicated the boring bar operated by a motor which drives the bar through one of the approved forms of reduction gears. Attention is called to the fact that the motor is fastened to the frame or housing of the reduction gear which in turn is suspended from the drive bushing—the motor and reduction gear acting to all intents and purposes as a single unit.

Figure 2 is a plan view of the boring bar showing the feed screw slot 10 sunk into and extending nearly to each end of the bar, the ends of the slot being stopped by a wall 11 having a hole 12 so the feed screw can be slid through.

Directly beyond the walls 11 and concentric with the holes 12 the boring bar has been counterbored to receive the heads 13 and 14 of the feed screw. The boring bar has also been counterbored at one end to receive the feed gears 7 and 9; gear 9 being shown in Figs. 3, 4 and 5.

The bar has been bored centrally a suitable amount to receive the end of a shaft 18 on which gear 9 revolves.

A plate 19 is secured to the end of the bar to not only protect the gears but act as an outer bearing for the extension on the end of the feed screw and for the outer end of the extension sleeve on gear 9.

The opposite end of the boring bar has been reduced in diameter and a sleeve or bushing 21 is shown on the same.

Figure 2 also shows a portion of the cutter head 20 with the feed nut 22, these being more clearly shown in Figs. 9 and 10.

There is also shown a small slot 23 extending from each end of the bar, parallel with and merging into the main feed screw slot 10, and on the same side of the feed screw slot 10 and merging into it is a series of notches 24. The purpose of these slots 23 and notches 24 will be more fully explained further on.

An operating wrench 25 slips over the outer end of shaft 18 and is arranged with internal dowels 26 to engage slots in the extension sleeve of the center gear 9 so as to control the movement of the same as desired. Several other ways of quickly engaging or disengaging this wrench 25 with gear 9 may be devised, if desired, but the simple method here shown is sufficient for the purpose intended.

Figure 3 is an elevation of the plan shown in Fig. 2, but with the cutter head 20 omitted. The feed nut 22, however, is shown.

Figures 4 and 5, 6 and 7 show more clearly the essential parts described above and Figure 8 is a longitudinal view of the feed screw. Before assembly, this feed screw is made in two pieces, a long portion threaded, and with a head on one end, and a shorter portion, not threaded and with a head on one end. Extending beyond the head on the short portion is a projection 15 that has been squared or flattened so as to act as a key for the gear 7, and it projects just long enough to extend a short distance beyond plate 19 so a wrench can be applied and the feed screw turned direct if desired.

The ends 16 and 17 are passed through the holes 12 in the boring bar and being brought together to the right length they are welded and made one. This can easily be done by the electric or other autogenous process with the feed screw in place in the feed screw slot.

There are other known methods of assembling a feed screw with heads secured at each end, in the feed screw slot of a boring bar, and having the feed screw passing through holes in the end walls of the slot but the method here shown is deemed sufficient for the purpose intended.

Figure 9 shows a section through the boring bar at A—A (see Fig. 2) with a portion of the cutter head on the bar, the feed nut engaging the feed screw and fitting into the recess in the head. A set screw 27 secures the feed nut to the head in the usual manner.

Figure 10 is a side elevation of the feed nut 22 and

Figure 11 is a section through the boring bar at B—B or its equivalent C—C, designated in Fig. 2. This shows that end walls 11, of the feed screw slot 10 are not only an integral portion of the boring bar but the top portion of these end walls are raised above the main periphery of the bar so as to form a complete full bearing area for the feed screw heads. The entrance slot 23 is also shown in this sectional view.

Figure 12 shows more clearly the drive or operating end of the boring bar assembly which consists of a motor driving a pinion 47 which meshes with a gear 29. This gear 29 is keyed to a worm shaft 30 which in turn operates or drives a worm wheel 31.

The inner hub of worm wheel 31 is shown as drive member 4. In the drive member 4 is mounted the boring bar 2, and the drive end of drive member 4, worm wheel 31, and worm 30 are all mounted in the worm and wheel housing 32.

This housing 32 is held stationary and prevented from rotating about the boring bar 2, by means of the bracket 33, secured to the housing 32 and held fast to the crossbar 5 by means of the bolt 34.

Means other than a bracket could be devised, connecting and securing the housing 32 to the boring bar supporting means 5, but the one herein described is deemed sufficient for the purpose intended.

The motor is shown secured to the worm and wheel housing 32 and thus is shown that while the entire bar drive mechanism is suspended from drive member 4 the counter rotation is prevented by the bracket 33 secured to crossbar 5 which in turn is fastened securely to the cylinder being bored.

In order to rotate the bar, drive member 4 is recessed part way its length for the application of a drive key 35 indicated in Fig. 13 and Fig. 14 and shown in end view Fig. 16, and plan Fig. 7.

Figure 13 shows the end view of drive member 4, recessed for the drive key 35, which is also shown contacting with the side wall of the feed screw slot 10. There is also shown the end view of the locking key 44 embedded in the drive member 4 with the lugs 45 fitting into the notches 24 formed in the bar.

Figure 14 shows a plan view of the hub or drive member 4 with a double thrust bearing mounted thereon. This consists of a central bearing race 36, an inner bearing race 37 and an outer bearing race 38. Anti-friction bearings 39 are interposed between these races, thus permitting them to freely revolve. Inner race 37 is held against a shoulder 40 on the drive member 4, and outer race 37 is held in place on drive member 4 by the adjusting nut 41, screwed on drive member 4. It will be noted that the central bearing race 36 does not contact with drive member 4 but does contact with both sets of anti-friction bearings 39.

This central bearing race 36 has its outer periphery made to fit snugly into and practically fill the bore of the hub 42 centrally located in the crossbar 5. Holes 43 are part way bored in the periphery of the central bearing race 36 so that when the inner end of the holding set screws 6 are forced into these holes, the central bearing race 36 is prevented from turning.

Figure 14 also shows the locking key 44 located parallel with and at one side of the recess for the drive key 35. The lugs 45 of this locking key are clearly shown extending into the notches 24 in Figure 13 which also shows that only the lugs 45 extend into the central bore of the drive member 4, the rest of the drive key being firmly embedded into drive member 4 so that to all intents and purposes they both are integral.

Figure 15 indicates the other end view of drive member 4 and shows a recess 46 which in the sectional view, Fig. 18, is shown to extend from the inner end of the drive key recess, with which it is aligned, to the outer end of drive member 4.

Figure 16 shows an end and Figure 17 shows a plan view of the drive key 35.

Figure 19 shows a plan, Figure 20 a side elevation and Figure 21 an end view of the locking key 44 with its lugs 45. While other ways of designing this locking key may be devised the method here shown is deemed sufficient for the purpose intended.

*Operation*

After the crossbars are fastened to the cylinder which is to be bored, and the boring bar with its adjustable cutter head has been centralized, the motor combined with the worm and wheel speed reducing unit with its double arrangement of anti-friction thrust bearings and its holding bracket is slid on the bar.

The lugs 45 of the lock key slide along in the entrance slot or groove 23 far enough to clear the inner face of the feed screw slot end walls 11, then the bar is given a slight turn, to align the lugs in the space between the feed screw and the side of the feed screw slot. The reducing unit can then be slid farther along the bar until the central anti-friction bearing race 36 is snugly fitted into the central bore of the crossbar hub 42 and firmly held by the set screws. A pin or bolt 34 secures the speed reducing bracket to the bottom end of the crossbar.

The boring bar is then shifted endwise a slight amount to line the lock key lugs 45 with the nearest adjacent set of notches 24, when it is given a slight turn so as to recess the lugs in the notches, and then the drive key 35 is inserted.

The drive member 4, in addition to being locked to the bar endwise is also keyed to the bar crosswise, and as it is prevented from moving along the bar longitudinally, it in turn prevents the boring bar from endwise or longitudinal movement because its thrust bearing is fitted into and held firmly in the central bore of the crossbar.

We have, therefore, provided a strong, secure means of holding the bar from the results of end thrust and can confidently increase the cutting feed of the cutter-head without causing the bar to jump or be shoved out of alignment. The notches in the bar provide for any desired adjustment to suit cylinders of various lengths and the anti-friction bearing mounting insures free smooth rotational movement.

When the bar rotates the feed screw gear 7 rotates about the axis of the bar. If, however, the centrally located gear 9 is prevented from rotating with the bar, by means of the wrench provided for that purpose, then the feed screw gear 7 while still rotating about the bar axis is also caused to rotate about its own axis. The feed gear 7 therefore causes the feed screw 8 to rotate which in turn causes the feed nut 22 to slide along the feed screw slot 10. As the cutter head 20 is secured to the feed nut 22 by the set screw 27, the cutter head slides along the bar with the feed nut and when the cutting tools are forced into the metal a cut is started in the cylinder longitudinally as well as circumferentially.

The boring bar here explained has the feed screw inserted through a hole near each end of the bar. A substantial head is formed on each end. A substantial bearing is provided under each head. The feed screw is formed into one homogeneous whole. Any thrust transmitted to the feed screw threads causes a pull or tension, opposite in direction to the thrust which is resisted by the head, and the feed screw, being always pulled in a straight line, with no tendency to bend, buckle or pucker, functions smoothly and truly.

Attention is also called to the fact that practically the entire weight of my drive mechanism hangs below the center of bar rotation thus making use of the force of gravity to help resist this counter rotational force and in addition I have provided a bracket so arranged that it is held to the crossbar support not only by means of the counter rotational force when in operation, but by means of a bolt thus securing the drive mechanism in such a compact manner to the crossbar itself as to counteract the cutting force when taking heavy cuts and heavy feeds and also to absorb and dissipate any counter force due to shock when the cutting tool strikes a hard spot in the cylinder or cuts across port openings or bridge walls.

Having thus described my invention and pointed out its many superior features, what I claim as new and desire to secure by Letters Patent is—

1. In a boring mechanism, a boring bar, means to support said bar in a cylinder, a boring head mounted on said bar, a drive member, a thrust bearing mounted on said drive member, said thrust bearing secured to said supporting means, said drive member bored for positioning said boring bar through said drive member bore, said drive member having lugs longitudinally spaced and projecting into said bore, said boring bar slotted from the end thereof to provide clearance for said lugs when said boring bar is positioned through said bore, said boring bar also slotted for a feed screw, the feed screw slot having a wall at each end thereof, each end wall provided with a hole therein, the feed screw passing through said holes, the clearance slots for the drive member lugs so formed in the bar that their side walls parallel the walls of the holes through the end walls of the feed screw slot, said clearance slot side walls connecting with the side walls of said feed screw slot, said feed screw slot side walls having notched recesses longitudinally spaced for selectively receiving the lugs of said drive member, means provided to feed said boring head into engagement with the cylinder being bored and thereby produce an end thrust, said end thrust transmitted by the boring bar to said lugs, thence to said drive member, thence to said thrust bearing mounted on said drive member, and finally to the means supporting said boring bar in the cylinder being bored.

2. In a boring mechanism a boring bar, means to support said bar in a cylinder, a boring head mounted on said bar, a drive member, a thrust bearing mounted on said drive member, said thrust bearing secured to said supporting means, said drive member bored for mounting on said boring bar, said drive member having a lug projecting into said bore, said boring bar slotted from the end thereof to provide clearance for said lug when said drive member is mounted on said bar, the side wall of said clearance slot having notched recesses for selectively receiving said lug and thereby adjustably positioning said drive member on said boring bar, means provided to feed said boring head into engagement with the cylinder being bored and thereby produce an end thrust, said end thrust transmitted by the boring bar to said lug thence to said drive member, thence to said thrust bearing and thence to the means supporting said boring bar in the cylinder being bored.

3. In a boring mechanism, a boring bar, means to support said bar in a cylinder, a boring head mounted on said bar, a drive member, a thrust bearing mounted on said drive member, said thrust bearing secured to said supporting means, said drive member bored for mounting on said boring bar, said drive member having lugs projecting into said bore, said lugs positioned longitudinally in said drive member, said boring bar slotted from the end thereof to provide clearance for said lugs when said drive member is mounted on said bar, the side wall of said clearance slot having notched recesses longitudinally spaced for selectively receiving said lugs and thereby adjustably positioning said drive member on said boring bar, means provided to actuate said boring head into engagement with the cylinder being bored and thereby produce an end thrust, said end thrust transmitted by the boring bar to said lugs, thence to said drive member, thence to said thrust bearing and thence to the means supporting said boring bar in the cylinder being bored.

4. In a boring mechanism, a boring bar, means to support said boring bar in a cylinder, a boring head mounted on said bar, a drive member, a thrust bearing mounted on said drive member, said thrust bearing secured to said supporting means, said drive member bored for mounting on said boring bar, said drive member having lugs longitudinally projecting into said bore, said boring bar slotted from the end thereof to provide clearance for said lugs when said drive member is mounted on said bar, said boring bar also slotted for a feed screw, the side wall of the clearance slot connecting with the side wall of the feed screw slot and the side wall of the feed screw slot having notched recesses longitudinally spaced for selectively receiving the lugs of the drive member, thereby adjustably positioning the drive member on the boring bar, means provided to feed said boring head into engagement with the cylinder being bored and thereby produce an end thrust, said end thrust transmitted by the boring bar to the lugs, thence to the drive member, thence to the thrust bearing mounted on said drive member and thence to the means supporting said boring bar in the cylinder being bored.

5. In a boring mechanism, a boring bar, means to support said boring bar in a cylinder, a boring head mounted on said bar, a drive member, a thrust bearing mounted on said drive member, said thrust bearing secured to said supporting means, said drive member bored for mounting on said boring bar, said drive member having lugs longitudinally spaced and projecting into said bore, said boring bar slotted from the end thereof to provide clearance for said lugs when said drive member is mounted on said bar, said drive member recessed for a drive key, said boring bar slotted for said drive key, the side wall of the clearance slot connecting with the side wall of the drive key slot and the side wall of the drive key slot in the boring bar having notched recesses longitudinally spaced for selectively receiving the lugs of the drive member, thereby adjustably positioning the drive member on the boring bar, means provided to actuate said boring head into engagement with the cylinder being bored and thereby produce an end thrust, said end thrust transmitted by the boring bar to the lugs, thence to the drive member, thence to the thrust bearing mounted on said drive member, and finally to the means supporting said boring bar in the cylinder being bored.

6. In a boring mechanism, a boring bar, means to support said boring bar in a cylinder, a boring head mounted on said bar, a drive member, a thrust bearing mounted on said drive member, said thrust bearing secured to said supporting means, said drive member bored for mounting on said boring bar, said drive member having lugs longitudinally spaced and projecting into said bore, said boring bar slotted from the end thereof to provide clearance for said lugs when said drive member is mounted on said boring bar, said boring bar slotted for a drive key, said boring bar also slotted for a feed screw, the side wall of the drive key slot merging into the side wall of the feed screw slot, the side wall of the clearance slot for the drive member lugs connecting with the merged side wall of the slot used for the drive key and the feed screw, said merged side wall having notched recesses longitudinally spaced for selectively receiving the lugs of the drive member, thereby adjustably positioning the drive member on the boring bar, means provided to feed the boring head into engagement with the cylinder being bored and thereby produce an end thrust, said end thrust transmitted by the boring bar to the lugs, thence to the drive member, thence to the thrust bearing mounted on said drive member, and finally to the means supporting said boring bar in the cylinder being bored.

7. In a boring mechanism, a boring bar, means to support said boring bar in a cylinder, a boring head mounted on said bar, a drive member, a thrust bearing mounted on said drive member, said thrust bearing secured to said supporting means, said drive member bored for mounting on said boring bar, said drive member having lugs longitudinally spaced and projecting into said bore, said boring bar slotted from the end thereof to provide clearance for said lugs when said drive member is mounted on said boring bar, the side wall of said clearance slot having notched recesses longitudinally spaced for selectively receiving said lugs, said lugs contacting with the side walls of said notched recesses, means provided to feed the boring head into engagement with the cylinder being bored and thereby produce an end thrust, said end thrust transmitted by the side walls of the notched recesses in the boring bar to the lugs fixed in the drive member, thence to said drive member, thence to said thrust bearing, and thence to the means supporting said boring bar in the cylinder being bored.

8. In a boring mechanism, a boring bar, means to support said bar in a cylinder, a boring head mounted on said bar, a drive member, a thrust bearing mounted on said drive member, said thrust bearing secured to said supporting means, said drive member bored for positioning said boring bar through said drive member bore, lugs fixed to said drive member longitudinally spaced and projecting into said drive member bore, said boring bar slotted from the end thereof to provide clearance for said lugs when said boring bar is positioned through said bore, the side wall of said clearance slot having notched recesses longitudinally spaced for selectively receiving said lugs and thereby adjustably positioning said boring bar in said drive member, said fixed lugs contacting with the side walls of said notched recesses, means provided to feed said boring head into engagement with the cylinder being bored and thereby produce an end thrust, said end thrust transmitted by the boring bar to said lugs, thence to said drive member, thence to said thrust bearing, and thence to the means supporting said boring bar in the cylinder being bored.

9. In a boring mechanism, a boring bar, means to support said bar in a cylinder, a boring head mounted on said boring bar, a drive member, a thrust bearing mounted on said drive member, said thrust bearing secured to said supporting means, said drive member bored for mounting on said boring bar, said drive member having lugs longitudinally spaced and projecting into said bore, said boring bar slotted from the end thereof to provide clearance for said lugs when said drive member is mounted on said boring bar, said drive member recessed for a drive key, said boring bar slotted for said drive key, the side wall of the lug clearance slot connecting with the side wall of the drive key slot in said boring bar, said drive key slot having notched recesses longitudinally spaced to selectively receive the lugs of the drive member thereby adjustably positioning the drive member on the boring bar, the drive key contacting with the drive member also contacting with the drive member lugs and also contacting with said boring bar, means provided to feed said boring head into engagement with the cylinder being bored and thereby produce an end thrust, said end thrust transmitted by the boring bar to the drive member lugs, thence to the drive member, thence to the thrust bearing mounted on said drive member, and finally to the means supporting the boring bar in the cylinder being bored.

10. In a boring mechanism, a boring bar, means to support said bar in a cylinder, a boring head mounted on said boring bar, a drive member, a thrust bearing mounted on said drive member, said thrust bearing secured to said supporting means, said drive member bored for mounting on said boring bar, said drive member having lugs longitudinally spaced and projecting into said bore, said boring bar slotted from the end thereof to provide clearance for said lugs when said drive member is mounted on said bar, said drive member recessed for a drive key, said boring bar slotted for said drive key, one side wall of the recess in said drive member made in alignment with one side wall of said lugs in said drive member, the side wall of the lug clearance slot in said boring bar merging into the side wall of said drive key slot in said boring bar, and said merged slot having notched recesses longitudinally spaced to selectively receive said lugs of said drive member thereby adjustably positioning said drive member on said boring bar, and when so positioned said drive key positioned in said drive member recess and positioned in said drive key slot in said boring bar, contacts with said side walls of said lugs and prevents the escapement of said lugs from said notched recesses, means provided to feed said boring head into engagement with the cylinder being bored and thereby produce an end thrust, said end thrust transmitted by the boring bar to the drive member lugs, thence to the drive member, thence to the thrust bearing mounted on said drive member, and finally to the means supporting the boring bar in the cylinder being bored.

11. In a boring mechanism a boring bar, means to support said bar in a cylinder, a boring head mounted on said bar, a drive member, a thrust bearing mounted on said drive member, said thrust bearing secured to said supporting means, said drive member bored for mounting on said boring bar, said drive member having a lug projecting into said bore, said boring bar slotted from the end thereof to provide clearance for said lug when said drive member is mounted on said bar, the side wall of said clearance slot having notched recesses longitudinally spaced for selectively receiving said lug, the boring bar partially turned about its axis when positioning said drive member lug in the selected side wall notched recess, thereby adjustably positioning said drive member on said boring bar, means provided to feed said boring head into engagement with the cylinder being bored and thereby produce an end thrust, said end thrust transmitted by the boring bar to said lug, thence to said drive member, thence to said thrust bearing and thence to the means supporting said boring bar in the cylinder being bored.

12. In a boring mechanism a boring bar, means to support said bar in a cylinder, a boring head mounted on said bar, a drive member, a thrust bearing mounted on said drive member, said thrust bearing secured to said supporting means, said drive member bored for mounting on said boring bar, said drive member having a lug projecting into said bore, said boring bar slotted from the end thereof to provide clearance for said lug when said drive member is mounted on said bar, the side wall of said clearance slot having notched recesses longitudinally spaced for selectively receiving said lug, the drive member partially revolved on the boring bar when positioning said drive member lug in the selected side wall notched recess thereby adjustably positioning said drive member on said boring bar, means provided to feed said boring head into engagement with the cylinder being bored and thereby produce an end thrust, said end thrust transmitted by the boring bar to said drive member lug, thence to said drive member, thence to said thrust bearing, and thence to the means supporting said boring bar in the cylinder being bored.

CONRAD L. MEISTER.